Sept. 3, 1957 R. L. McINTIRE 2,805,131
PROCESS AND APPARATUS FOR PRODUCTION OF ACETYLENE
AND CARBON BLACK
Filed April 26, 1954 4 Sheets-Sheet 2

INVENTOR:
R. L. McIntire
BY
Hudson and Young
ATTORNEYS

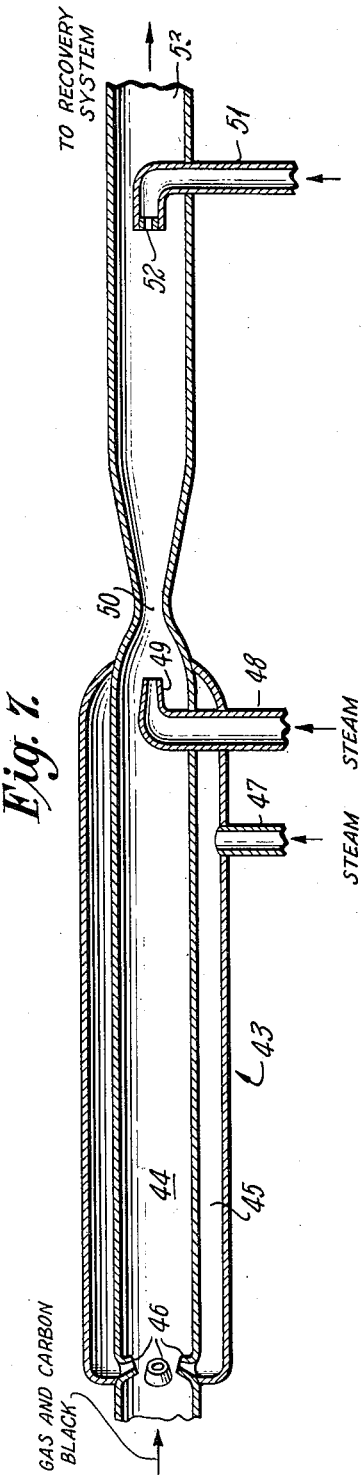
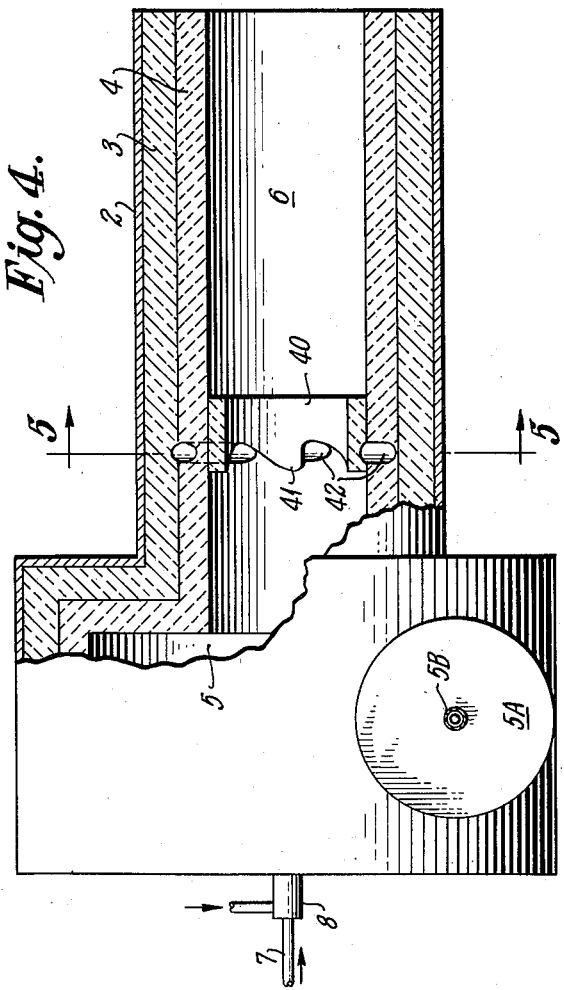

INVENTOR:
R. L. McIntire
BY Hudson and Young
ATTORNEYS

United States Patent Office 2,805,131
Patented Sept. 3, 1957

2,805,131

PROCESS AND APPARATUS FOR PRODUCTION OF ACETYLENE AND CARBON BLACK

Robert L. McIntire, Bartlesville, Okla., assignor to Phillips Petroleum Company, a corporation of Delaware Application April 26, 1954, Serial No. 425,366

18 Claims. (Cl. 23—209.4)

This invention relates to the production of acetylene by pyrolysis of hydrocarbons. In one aspect it relates to a process for the simultaneous production of carbon black and acetylene. In another aspect it relates to novel apparatus for the recovery of acetylene formed as an intermediate during the production of carbon black. In another aspect it relates to a novel apparatus for the quenching of, and the recovery of acetylene from, a by-product gas obtained during the production of carbon black.

Krejci Patents 2,375,795, 2,375,796, 2,375,797 and 2,375,798 (1945) disclose and claim processes and apparatus for the production of carbon black by injecting a stream of reactant hydrocarbon into the interior of a helically moving mass of combustion gas in a cylindrical reaction chamber, the combustion gas being produced, for example, by the tangential introduction of air, or air and fuel, into the reaction chamber. Krejci Patent 2,377,245 (1945) discloses and claims the production of acetylene by a similar process. Krejci Patent 2,564,700 (1951) discloses a somewhat similar process and apparatus wherein the combustion gas is produced by combustion of a tangentially introduced mixture of fuel and oxygen-containing gas in a cylindrical combustion zone positioned immediately upstream from the reaction zone. Copending Krejci application Serial No. 360,956 filed June 11, 1953, now U. S. Patent 2,750,434 discloses and claims the production of acetylene in this type of apparatus. Processes of the type above mentioned are often referred to as "tangential flame" processes. That disclosed in Patent 2,564,700 is often referred to as a "pre-combustion" tangential flame process.

Although the prior art has disclosed the production of acetylene and the production of carbon black in a reactor of the tangential flame type, it has been the practice in the prior art to produce either carbon black exclusively or acetylene exclusively, rather than the simultaneous production of both carbon black and acetylene. The reason has been that, when prior art processes were utilized for the production of carbon black, little or no acetylene ordinarily appeared in the furnace effluent and when the processes were operated for optimum production of acetylene, substantially no carbon black was formed.

This invention provides a process and apparatus whereby acetylene which is formed as an intermediate in the production of carbon black can be recovered without impairment of the carbon black yield.

It has been discovered that, in a process of the tangential flame type, wherein carbon black is produced in high yields, appreciable amounts of acetylene are formed, but that the acetylene survives for a relatively short time in the furnace, and that this appears to be the reason why the concentration of acetylene in the effluent gas from such a carbon black process is ordinarily rather low. Thus, for example, in a process in which carbon black is produced in a precombustion type furnace, as disclosed in United States Patent 2,564,700 (1951), the acetylene concentration in the carbon black-containing effluent from the furnace has a concentration of approximately 0.4 volume percent. However, when a sample of the gas is withdrawn from a point in the reaction chamber relatively close to the inlet thereof, the withdrawn gas may contain from 1 to 2 volume percent acetylene.

According to this invention, in a carbon black process of the tangential flame type, part of the gas passing through the furnace is withdrawn therefrom at a point upstream of that part of the chamber at which mixing of combustion and reactant gases is completed. The withdrawn gas is then processed for the recovery of relatively high yields of acetylene and carbon black. One skilled in the art can readily determine the point at which mixing is completed by withdrawing samples of gas from the reactor at different points along and across the reactor, determining the acetylene content of the samples, and plotting curves of constant acetylene concentration as subsequently illustrated herein.

In accordance with the invention, it has been found that, in a precombustion type reactor having a reaction chamber from 3 to 15 inches in diameter, a gas withdrawn from the reaction chamber at a point from 4 to 15 inches from the inlet to the reaction chamber has a much higher acetylene concentration than the effluent withdrawn from the main outlet of the furnace.

Further according to this invention, there is provided in a tangential flame type reactor, means for withdrawing gas from the reactor at a locus upstream of the outlet of the reaction chamber. Where the diameter of the reaction chamber is from 3 to 15 inches, the withdrawal means is positioned to withdraw gas at a locus not farther than 15 inches downstream from the inlet of the reaction chamber. The withdrawal conduit provided according to this invention can be peripherally or non-peripherally positioned with respect to the reaction chamber.

Several embodiments of the invention are illustrated in the drawings.

Figure 4 is an elevational view, partially in section, of another embodiment of this invention.

Figure 7 is a sectional elevation of quench conduit 43, illustrated in Figure 5.

Figure 1:
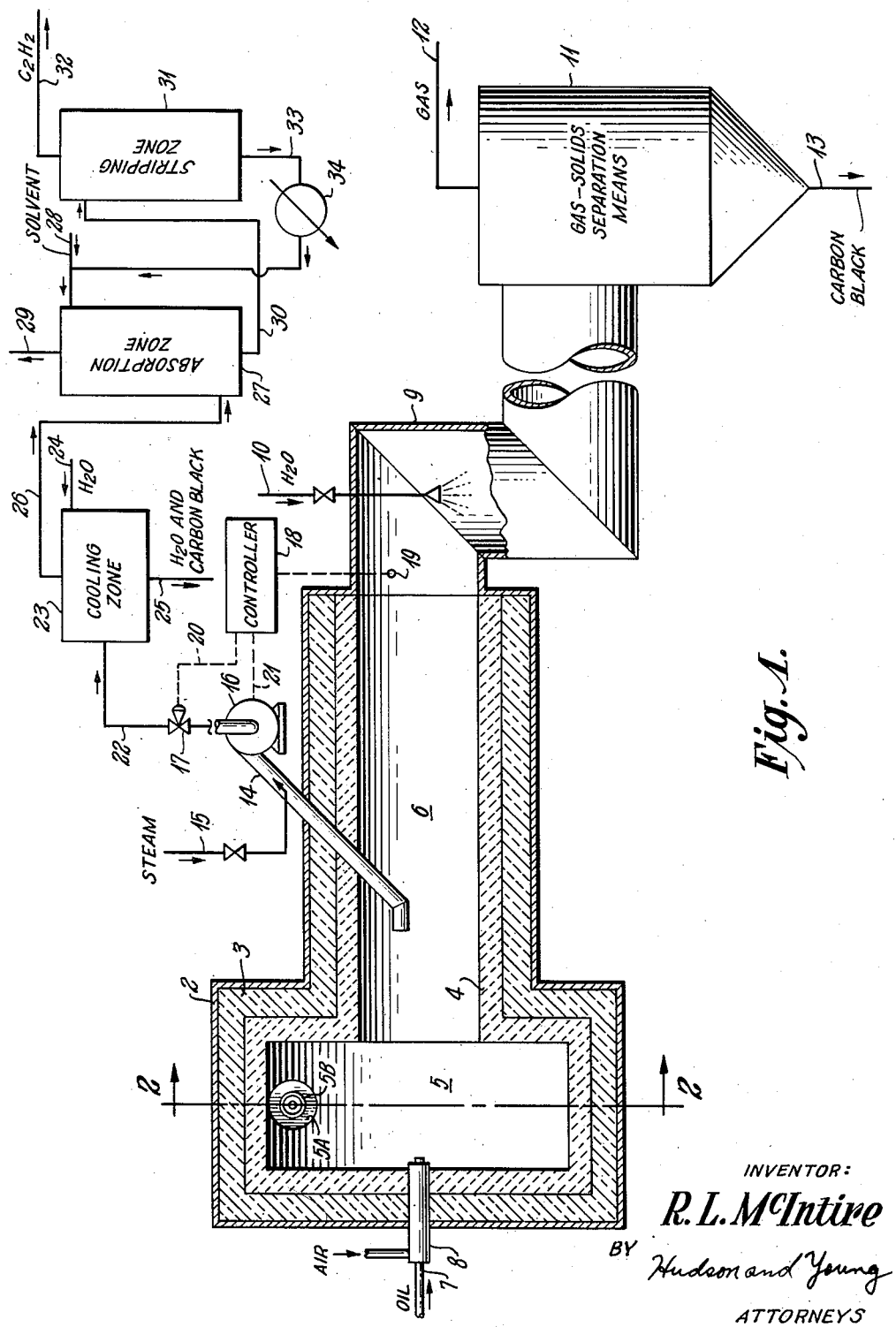
Figure 1 is a flow diagram illustrating one embodiment of this invention and shows an elevational view of a carbon black reactor, partially in section.
Figure 2:
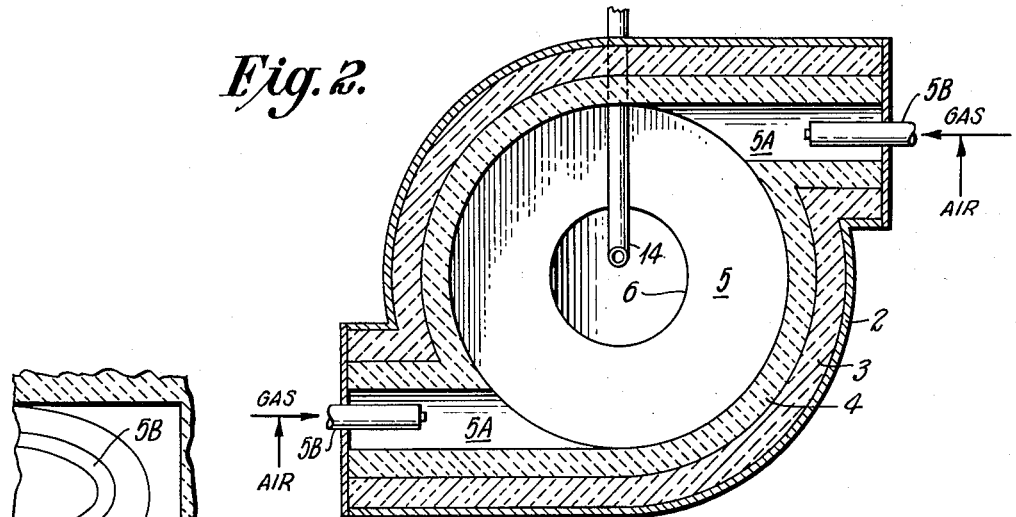
Figure 2 is a cross-sectional view taken along line 2—2 of Figure 1.

As illustrated in Figure 1, the reactor comprises metal shell 2 within which are positioned insulation 3 and refractory liner 4. Within the reactor, are thus formed combustion chamber 5 and reaction chamber 6. Combustion chamber 5 is substantially cylindrical and is provided with tangential inlets 5A in which are positioned burners 5B. Reaction chamber 6 is also substantially cylindrical and has a smaller diameter than combustion chamber 5. Ordinarily, combustion chamber 5 has a diameter which is greater than its length. Axially positioned in the end wall of combustion chamber 5 are oil inlet 7 and air jacket 8, which surrounds oil inlet 7. Pipe 9 is connected to the outlet end of reaction chamber 6. Extending into the interior of pipe 9 is quench inlet 10 which is provided with a spray means within pipe 9. Connected to pipe 9 is gas-solids separation means 11, which can comprise a cyclone separator, an electrostatic precipitator, a bag filter, or any desired combination of these elements or any other equivalent means known in the art for separating fine solids from a gas. Outlets 12 and 13 are provided in separation means 11 for the withdrawal of off-gas and carbon black, respectively. The apparatus thus far discussed in connection with Figures 1 and 2 is disclosed in Krejci Patent 2,564,700 (1951).

According to this invention, there is also provided withdrawal conduit 14 which extends through the wall of reaction chamber 6 into the interior thereof. Any suitable means, such as pipe 15, is provided for the introduction of steam into the interior of withdrawal conduit 14. Attached to conduit 14 is suction fan 16, which can be of any conventional type known in the art. Connected with the pressure side of fan 16 is conduit 22 having a motor valve 17. Controller 18 is provided in connection with control member 19, which is positioned within pipe 9, or, if desired, within reaction chamber 6. Control member 19 can be an anemometer or a Pitot tube. When anemometer is used it can be connected with a generator which supplies electrical energy to controller 18. When member 19 is a Pitot tube, it can be connected to a manometer which actuates electrical contacts which vary a supply of electrical energy to controller 18. Controller 18 can be any suitable combination of amplifiers and servo mechanisms known in the art of process control. For example, it can be a combination of an amplifier with a device for translating electrical energy into air pressure which can be applied, in turn, through control line 20 to a diaphragm of motor valve 17, or it can be a combination of an amplifier with a servo mechanism which operates a variable resistance which in turn controls the speed of a motor which operates fan 16, this modification being illustrated as connecting line 21. Such apparatus is well known in the process control art. Equivalent control apparatus can, of course, be used.

Conduit 22 communicates with cooling zone 23 which can be an ordinary water scrubbing apparatus. Absorption zone 27 can be any known type of apparatus for contacting a gas with a liquid solvent. Stripping zone 31 can be any known type of apparatus for stripping dissolved gas from a solvent containing the same.

In the operation of the process according to the embodiment of this invention illustrated in Figure 1, a reactant hydrocarbon, such as a gas oil, is supplied to combustion zone 5 through inlet 7. The oil can be supplied in the liquid state or it can be preheated and vaporized, in means not shown. A relatively small proportion of air is supplied to jacket 8 in the form of an annular stream which surrounds the injected stream of oil and thus prevents carbon deposition on the outlet end of the conduit 7. The air also serves to cool members 7 and 8, thus inhibiting oxidation. Simultaneously, a combustible mixture of gas and air is supplied through burners 5B to inlets 5A in combustion zone 5. Combustion is initiated upon entry into the tangential inlets and is substantially completed near the periphery of chamber 5 and prior to contact of resulting combustion gases with the axially introduced oil. Ordinarily, combustion is completed within inlets 5A. The combustible mixture is supplied at a very high linear velocity so that the resulting combustion gases travel spirally toward the axis of chamber 5 and then into chamber 6 in a generally helical path, initially forming an annular sheath of hot combustion gases surrounding the oil which is introduced through inlet 7. Heat is imparted directly from the hot combustion gases to the reactant oil within chamber 6, and the oil is reacted to form carbon black, acetylene being formed as an intermediate or by-product. The resulting mixture of gas and carbon black passes from chamber 6 into pipe 9 and is cooled by the direct addition of water through inlet 10, the resulting temperature being below about 1250° F. The temperature within reaction zone 6 is ordinarily in the range 2000–4000° F. and usually from 2200 to about 3000° F. The initially cooled mixture of carbon black gas passes through pipe 9 and is further cooled, for example by use of indirect heat exchange (not shown). The cooled mixture passes to separation means 11, from which carbon black is recovered through outlet 13 and combustion gas is removed through outlet 12.

A relatively minor proportion of the gas passing through reaction chamber 6 is withdrawn through withdrawal conduit 14. The open end of conduit 14 is positioned inside reaction chamber 6 at a point upstream from that in which mixing of combustion and reactant gases is completed. In this region the acteylene content of the gas is substantially higher than that of the gas withdrawn through pipe 9. The gas withdrawn through conduit 14 is initially cooled, by steam injected through pipe 15, to a temperature, e. g. 1000° F. or lower, at which acetylene does not decompose. The withdrawn gas passes through conduit 22 to cooling zone 23. In withdrawing gas through conduit 14, it is desirable that the volume of gas withdrawn and the rate of withdrawal be sufficiently low that the general pattern of flow through reaction chamber 6 is not disturbed. For this purpose, control member 19 and controller 18 are provided so that if the linear velocity, as measured by a Pitot tube or an anemometer near the outlet of reaction chamber 6, falls below a predetermined minimum, motor valve 17 is automatically throttled or the speed of fan 16 is automatically diminished, thus restoring proper flow conditions within chamber 6.

In cooling zone 23 the withdrawn gas is cooled and scrubbed with water added through inlet 24. The scrubbing action of the water removes the carbon black from the gas as a slurry, which is withdrawn through outlet 25 and processed for the recovery of carbon black by means known in the art. The scrubbed gas passes through conduit 26 to absorption zone 27 in which it is contacted with a solvent, added through inlet 28, which solvent selectively dissolves acetylene from the gas. Numerous solvents of this type are known in the art, examples being dimethylformamide, water, and acetic acid. When water is used, it is desirable to maintain absorption zone 27 at a substantial superatmospheric pressure. Acetylene-free gas is withdrawn from the system through outlet 29. Enriched solvent passes through conduit 30 to stripping zone 31, in which the solvent is heated and/or subjected to a pressure reduction, acetylene thus being liberated. The recovered acetylene is withdrawn through outlet 32. The stripped solvent is passed through recycle line 33 and cooler 34 and returned to absorption zone 27. Other known methods of recovering or concentrating the acetylene, such as fractional distillation or absorption, can be used along with or instead of solvent extraction.

Figure 3:
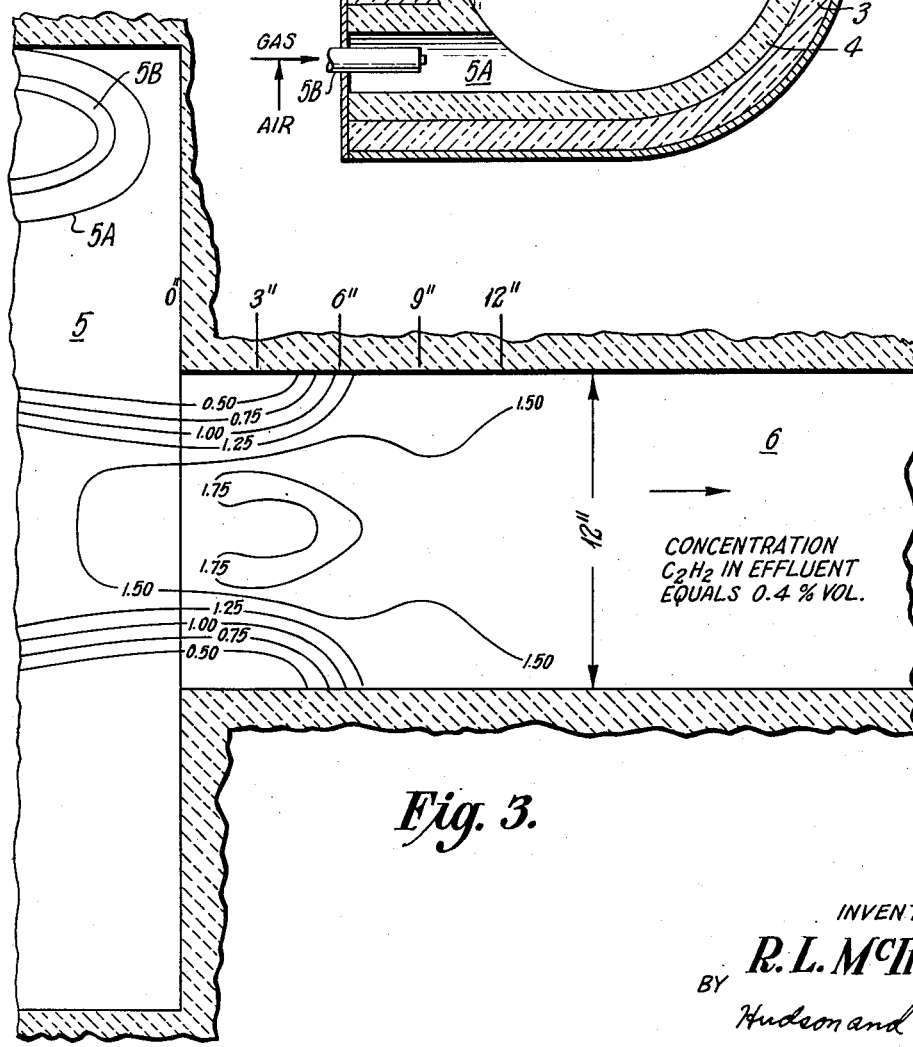
Figure 3 is a diagram showing lines of constant acetylene content in the gas flowing through a reactor of the type illustrated in Figure 1.

Figure 3 illustrates the acetylene content of a gas in a precombustion-type tangential-flame furnace during the production of carbon black from a gas oil. The lines drawn within reaction chamber 6 are lines of constant acetylene composition. It is clear from Figure 3 that a substantial variation in acetylene concentration occurs between various points within the reaction chamber. Downstream from the 1.50 percent line, complete mixing and homogeneity with respect to acetylene occur. It has been found that the maximum concentration of acetylene occurs between about the middle of chamber 5 and about 15 inches from the inlet to chamber 6 and that the configuration shown in Figure 3 varies substantially negligibly with diameter of reaction chamber 6, at least between diameters of 3 and 15 inches. Although, it is generally preferred to withdraw the acetylene-containing gas from within reaction zone 6, it is clear from Figure 3 that such gas can be withdrawn from the interior of combustion chamber 5. In the latter case, damage to the withdrawal conduit by the intense radiation in chamber 5 must be reckoned with, ordinarily by replacing the withdrawal conduit from time to time.

Figure 5:
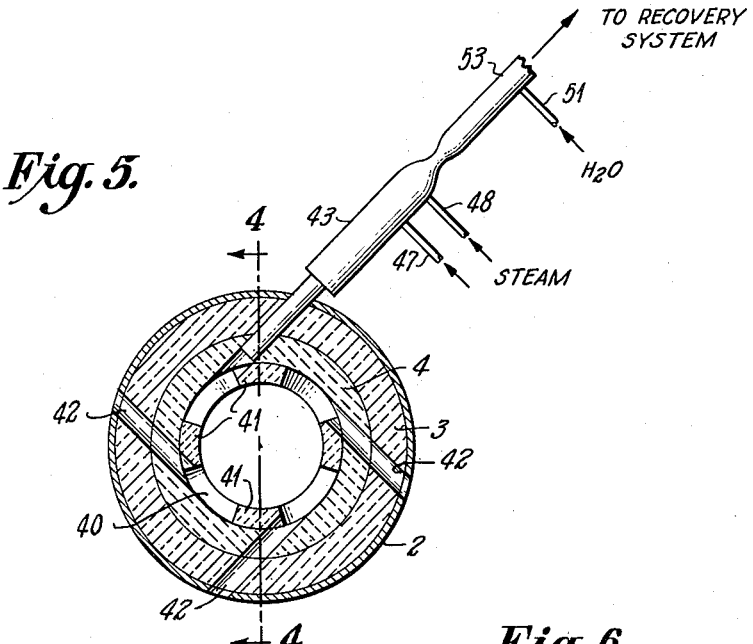
Figure 5 is a cross-sectional view taken along the line 5—5 of Figure 4 and illustrates the position of a novel quenching means, according to this invention, with respect to the reactor of Figure 4.
Figure 6:
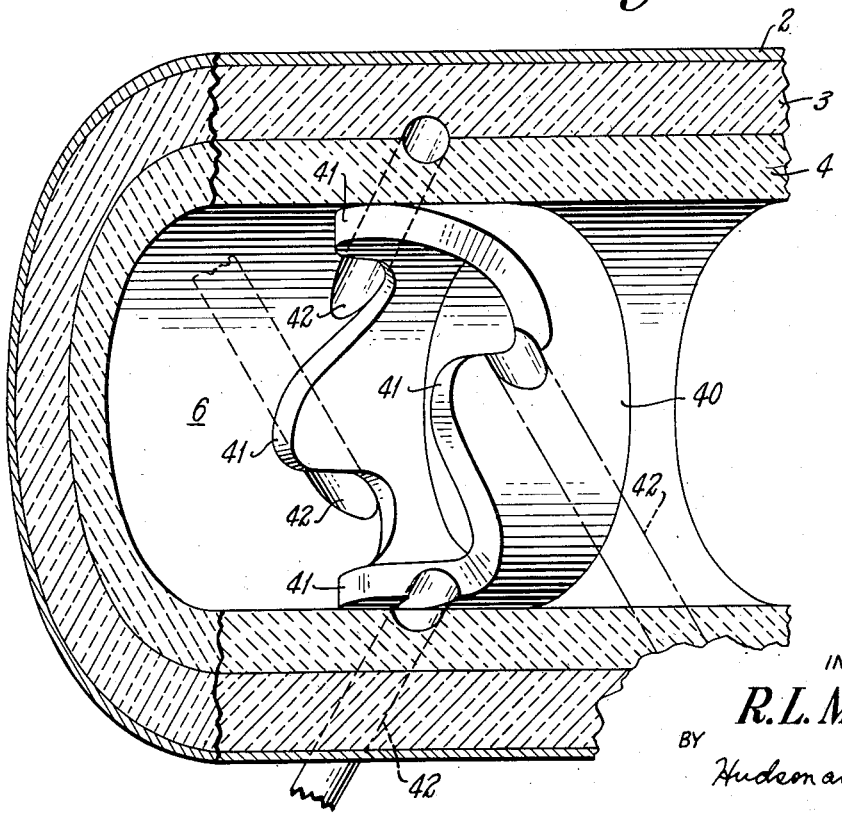
Figure 6 is a perspective view of the annular baffle 40 shown in Figure 4.

Figure 4 illustrates a modified, and often preferred, form of the reactor shown in Figure 1. As shown in Figure 4, gas is withdrawn from reaction chamber 6 at peripheral withdrawal points, the withdrawal conduits or ports 42 being positioned tangentially with respect to the inner wall of reaction chamber 6. Positioned within chamber 6, at a point upstream of the point of complete mixing, is annular baffle 40, which is ordinarily constructed of refractory material, suitably the same material as liner 4. The upstream edge of baffle 40 is provided with extensions 41 which form recesses in the upstream edge in which the outlet ports 42 are positioned. The general contour of the upstream edge corresponds to the helical direction of flow of the gases in the furnace. All edges of baffle 40 are preferably smoothed or streamlined. Gas withdrawn through ports or outlets 42 passes through quenching means 43, subsequently described, and then to a recovery system of any desired type, such as that illustrated in connection with Figure 1. Ports 42 can be radially positioned with respect to chamber 6 instead of tangentially as illustrated in Figure 5. In the embodiment of the invention illustrated in Figure 4, the ports 42 are positioned between about 4 and about 15 inches downstream from the inlet of chamber 6 when this chamber has a diameter in the range 3 to 15 inches.

Figure 7 illustrates a quenching device according to this invention. This device comprises gas tube 44 which is enclosed within steam jacket 45. Jacket 45 communicates with the interior of tube 44 through jets 46 which can be of any desired number. Steam inlet 47 is provided in jacket 45. Extending into the interior of tube 44 is steam inlet 48 which terminates in nozzle or jet 49. Nozzle 49 is positioned near the inlet of constriction 50 and, in this embodiment of this invention, provides the main aspiration effect for the withdrawal of gas from chamber 6. Pipe 44 connects, through constriction 50, with outlet pipe 53, in which is positioned water quench inlet 51, provided with nozzle or spray means 52. As indicated in Figure 7, fabrication can be accomplished by welding. Other methods of fabrication can, however, be utilized and are necessary when non-metallic refractory materials are used to construct the quench device.

Gas withdrawn from reaction chamber 6 through pipe 44 at a very high temperature, e. g. 2600° F., is initially cooled, for example, to about 1000° F., by steam injected through pipe 47, jacket 45 and jets 46. Further cooling is obtained by indirect heat exchange with the steam in jacket 45. Further cooling is obtained by the addition of steam through inlet 48, and still further cooling is effected by water added through inlet 51. The cooled gas is passed from pipe 53 to a recovery system of the type illustrated in Figure 1.

The reactant hydrocarbon used in the process of this invention can be any hydrocarbon which can be reacted to form carbon black by pyrolysis. Thus gaseous hydrocarbons such as methane, ethane, and butane can be used. Also normally liquid hydrocarbons such as heptane or decane and mixtures such as gasoline, kerosine or gas oil are suitable. A feed which is often preferred is a highly cyclic or aromatic gas oil, such as recycle gas oil obtained in a catalytic or thermal cracking process. The reactant can be preheated. It can be injected in the vapor or in the liquid phase.

Suitable fuels which can be added tangentially through inlets 5A, are methane, residue gas, natural gas, or liquid hydrocarbon fuel. Air is satisfactorily used as the oxidizing component of the fuel mixture. Oxygen or oxygen-enriched air can also be used. The fuel gas and the air can be preheated, either in admixture or individually.

Withdrawal conduit 14 or conduits 42 can be constructed of heat- or corrosion-resistant metals or of non-metallic refractory materials such as silica or zirconia. Any desired number of withdrawal conduits can be used.

It is ordinarily preferred that the amount of gas withdrawn through the withdrawal conduits shall not exceed about 20 percent of the total volume of gas passing through reaction chamber 6 and it is further preferred that the withdrawn portion shall not exceed 10 percent of the total gas.

*Example*

A gas oil having a Bureau of Mines Correlation Index of 92.5 and an API gravity of 13.7° was injected axially into a furnace similar to that shown in Figure 4. Air and methane-containing gas were injected tangentially into the reactor, which was equipped with two tangential inlets. The internal diameter of the reaction chamber was 4 inches. The internal diameter of the combustion chamber was 15 inches and the length of the combustion chamber was approximately 5 inches. Each of the tangential inlets had an internal diameter of 4.75 inches and a length of 17.5 inches. The gas and air were supplied through a tangential burner, the gas being supplied at a rate of 1,560 standard cubic feet per hour and the tangential air being supplied at the rate of 23,440 standard cubic feet per hour. The oil introduction rate was 29.5 gallons per hour. Air was supplied to the axial jacket 8 at the rate of 1,000 standard cubic feet per hour. The average linear velocity of flow through reaction chamber 6 was approximately 560 feet per second. The variations in concentration of acetylene within the reaction zone was approximately the same as that shown in Figure 5.

Approximately 5 volume percent of the total gas passing through the reaction chamber is withdrawn through conduits 42, each of which is positioned about 12 inches from the inlet to the reaction chamber and provided with a quench device 43. The quenched gas, at a temperature of approximately 500° F. is cooled by scrubbing with water and the carbon black is recovered as a water slurry. The scrubbed gas is then contacted with dimethylformamide at approximately 70° F. and about 50 p. s. i. The enriched dimethylformamide is stripped by heating, and acetylene amounting to about 1.4 volume percent of the withdrawn gas is recovered.

The main effluent withdrawn from the outlet end of the reaction chamber is passed through a series of cyclone separators and Cottrell precipitators, and high-grade carbon black is recovered therefrom.

While certain process steps, examples and structures are shown herein for purposes of illustration, the invention is clearly not limited thereto. The essence of the invention is that there has been provided in a carbon black process of the tangential flame type, the improvement comprising withdrawing part of the gas passing through the reaction chamber in such a process, from a point upstream of the point at which mixing is complete, and recovering acetylene from the gas withdrawn, and that there has also been provided a novel apparatus for effecting the withdrawal and recovery. Variation and modification are possible within the scope of the disclosure and claims. Thus it is within the scope of the invention to apply the withdrawal method and apparatus to a carbon black process utilizing a furnace which is of substantially the same diameter throughout, the combustion chambers 5 of Figure 5 thus being eliminated, and the tangential inlets being positioned adjacent the inlet end wall of the reactor and tangentially with respect to the reaction chamber. Also, air or other oxygen-containing gas can be used as the sole tangential feed in such a process.

I claim:

1. In a process in which carbon black is produced by injecting a hydrocarbon into the interior of a helically moving mass of hot combustion gas which imparts heat directly to said hydrocarbon, thus causing the formation of carbon black and acetylene, the improvement which comprises withdrawing from a locus upstream of the point at which mixing of gas becomes complete, part of the gas resulting from contact of said hot combustion gas with said hydrocarbon, said gas at said locus having a higher acetylene content than the completely mixed gas and recovering acetylene from the gas withdrawn.

2. A process which comprises passing hot combustion gas through an upstream portion of a substantially cylindrical reaction zone in a helical path along the wall thereof, passing a reactant hydrocarbon longitudinally into said reaction zone, reacting said reactant hydrocarbon to form carbon black and acetylene by means of heat imparted to said hydrocarbon directly from said combustion gas, a substantially homogeneous gas mixture being formed in a downstream portion of said zone, recovering carbon black from an effluent withdrawn from said downstream portion, withdrawing part of the gas flowing through said zone at a locus upstream from that at which said substantially homogeneous gas mixture is initially formed, at which upstream locus the acetylene concentration in the gas is greater than that of said homogeneous gas mixture and recovering acetylene from the withdrawn gas.

3. A process which comprises tangentially injecting a combustible mixture comprising a fuel gas and an oxidizing gas into a substantially cylindrical combustion zone which is contiguously and coaxially positioned in open communication with a substantially cylindrical reaction zone of smaller diameter than said combustion zone; effecting combustion of said mixture adjacent the periphery of said combustion zone, thus forming a spirally traveling mass of hot combustion gas; longitudinally injecting a reactant hydrocarbon into said combustion zone; passing said reactant hydrocarbon, initially surrounded by a helically moving annulus of said combustion gas, into said reaction zone, whereby said reactant hydrocarbon is converted to carbon black and acetylene and substantially complete mixing of gases to form a substantially homogeneous gas occurs in a downstream portion of said reaction zone; withdrawing effluent from the downstream end of said reaction zone; recovering carbon black from said effluent; withdrawing gas from a locus upstream of that of complete gas mixing, at which upstream locus the acetylene concentration of the gas is greater than in said substantially homogeneous gas, and recovering acetylene from the withdrawn gas.

4. A process according to claim 3 wherein said withdrawn gas is withdrawn from a nonperipheral locus within one of said zones.

5. A process according to claim 3 wherein said withdrawn gas is withdrawn from the periphery of said reaction zone.

6. A process according to claim 3 wherein the volume of said withdrawn gas is not greater than 20 percent of the total volume of gas flowing through said zones.

7. A process according to claim 3 wherein the volume of said withdrawn gas is not greater than 10 percent of the total volume of gas flowing through said zones.

8. A process according to claim 3 wherein said withdrawn gas is quenched to a temperature at which the acetylene therein does not decompose, and said acetylene is recovered by absorption in a solvent which is selective for acetylene and stripping of absorbed acetylene from said solvent.

9. In a carbon black production reactor having a substantially cylindrical cross-section, a longitudinal inlet at one end, an outlet at the opposite end, and at least one tangential inlet in a wall of said reactor, the improvement comprising means for withdrawing gas from a locus in said reactor intermediate said outlet and said longitudinal inlet, and acetylene recovery means in communication with said means for withdrawing gas.

10. In a carbon black production reactor comprising a cylindrical combustion chamber positioned contiguously and coaxially and in open communication with a cylindrical reaction chamber having a smaller diameter than said combustion chamber, axially positioned inlet means in said combustion chamber, tangentially positioned inlet means in said combustion chamber, and outlet means at the end of said reaction chamber opposite said combustion chamber, the improvement comprising a conduit extending through the wall of said reaction chamber and into the interior of said reactor and having an open end which is positioned within said reactor at a locus intermediate the middle of said combustion chamber and a downstream portion of said reaction chamber, and acetylene recovery means in communication with said conduit.

11. A reactor according to claim 10, wherein said reaction chamber has a diameter in the range 3 to 15 inches and said open end of said conduit is positioned nonperipherally at a locus intermediate the middle of said combustion chamber and a locus 15 inches from the inlet end of said reaction chamber.

12. In a carbon black production reactor comprising a cylindrical combustion chamber positioned contiguously and coaxially in open communication with a cylindrical reaction chamber having a smaller diameter than said combustion chamber, axially positioned inlet means in said combustion chamber, tangentially positioned inlet means in said combustion chamber, and outlet means at the end of said reaction chamber opposite said combustion chamber, the improvement comprising at least one peripheral outlet extending through the side wall of said reaction chamber at a locus therein intermediate the ends thereof and in communication with acetylene recovery means.

13. Apparatus for the simultaneous production of carbon black and acetylene, comprising, in combination: a cylindrical combustion chamber coaxially and contiguously positioned in open communication with a cylindrical reaction chamber having a smaller diameter than said combustion chamber; an axial inlet to said combustion chamber; at least one tangential inlet to said combustion chamber; an outlet at the end of said reaction chamber opposite said combustion chamber, said outlet communicating with carbon black recovery means; an annular baffle positioned coaxially within said reaction chamber intermediate the ends thereof, the edge of said baffle which faces said combustion chamber having a plurality of recessed portions; and a plurality of peripheral outlets in the wall of said reaction chamber, each of said peripheral outlets being substantially tangential to the inner surface of said reaction chamber and terminating at the inner surface of said reaction chamber within a recessed portion of said baffle.

14. Apparatus according to claim 13, and comprising quenching means and acetylene recovery means in communication with said peripheral outlets.

15. Apparatus for the simultaneous production of carbon black and acetylene, comprising, in combination: a cylindrical combustion chamber coaxially and contiguously positioned in open communication with a cylindrical reaction chamber having a diameter in the range 3 to 15 inches and smaller than the diameter of said combustion chamber; an axial inlet to said combustion chamber; at least one tangential inlet to said combustion chamber; an outlet at the end of said reaction chamber opposite said combustion chamber, said outlet communicating with carbon black recovery means; an annular baffle positioned coaxially within said reaction chamber intermediate the ends thereof, the edge of said baffle which faces said combustion chamber having a plurality of recessed portions; and a plurality of peripheral outlets in the wall of said reaction chamber spaced from 4 to 15 inches downstream from the inlet end of said reaction chamber, each of said peripheral outlets being substantially tangential to the inner surface of said reaction chamber and terminating at the inner surface of said reaction chamber within a recessed portion of said baffle.

16. A process which comprises tangentially injecting a combustible mixture comprising a fuel gas and an oxidizing gas into a substantially cylindrical combustion zone which is contiguously and coaxially positioned in open communication with a substantially cylindrical reaction zone of smaller diameter than said combustion zone, said diameter being in the range 3 to 15 inches; effecting combustion of said mixture adjacent the periphery of said combustion zone, thus forming a spirally traveling mass of hot combustion gas; longitudinally injecting a reactant hydrocarbon into said combustion zone; passing said reactant hydrocarbon, initially surrounded by a helically moving annulus of said combustion gas, into said reaction zone, whereby said reactant hydrocarbon is converted to carbon black and acetylene and substantially complete mixing of gases occurs in a downstream portion of said reaction zone to form a substantially homogeneous gas; withdrawing effluent from the downstream end of said reaction zone; recovering carbon black from said effluent; withdrawing, from a locus from about the longitudinal midpoint of said combustion zone to a point about 15 inches downstream from the inlet of said reaction zone and upstream from said downstream portion, part of the gas flowing through said zones, the gas at said locus having a substantially higher acetylene concentration than said homogeneous gas, and recovering acetylene from the withdrawn gas.

17. A process which comprises tangentially injecting a combustible mixture comprising a fuel gas and an oxidizing gas into a substantially cylindrical combustion zone which is contiguously and coaxially positioned in open communication with a substantially cylindrical reaction zone of smaller diameter than said combustion zone, said diameter being in the range 3 to 15 inches; effecting combustion of said mixture adjacent the periphery of said combustion zone, thus forming a spirally traveling mass of hot combustion gas; longitudinally injecting a reactant hydrocarbon into said combustion zone; passing said reactant hydrocarbon, initially surrounded by a helically moving annulus of said combustion gas, into said reaction zone, whereby said reactant hydrocarbon is converted to carbon black and acetylene and substantially complete mixing of gases occurs in a downstream portion of said reaction zone to form a homogeneous gas; withdrawing effluent from the downstream end of said reaction zone; recovering carbon black from said effluent; withdrawing, from a locus from about 4 to about 15 inches downstream from the inlet of said reaction zone and upstream from said downstream portion, part of the gas flowing therethrough, the gas at said locus having a substantially higher acetylene concentration than said homogeneous gas, and recovering acetylene from the withdrawn gas.

18. A process according to claim 3 wherein both carbon black and acetylene are recovered from said withdrawn gas.

References Cited in the file of this patent

UNITED STATES PATENTS

| | | |
|---|---|---|
| 1,839,952 | Dailey | Jan. 5, 1932 |
| 2,207,390 | White | July 9, 1940 |
| 2,252,955 | Woods | Aug. 19, 1941 |
| 2,368,827 | Hanson et al. | Feb. 6, 1945 |
| 2,377,245 | Krejci | May 29, 1945 |
| 2,420,999 | Ayers | May 27, 1947 |
| 2,442,898 | Maguire | June 8, 1948 |
| 2,443,210 | Upham | June 15, 1948 |
| 2,552,277 | Hasche | May 8, 1951 |
| 2,564,700 | Krejci | Aug. 21, 1951 |
| 2,606,821 | Harris | Aug. 12, 1952 |
| 2,659,663 | Heller | Nov. 17, 1953 |